United States Patent [19]

Curley

[11] Patent Number: 4,678,351

[45] Date of Patent: Jul. 7, 1987

[54] RIGHT MARGIN ZONE HYPHENATION

[75] Inventor: Charles M. Curley, Ithaca, N.Y.

[73] Assignee: SCM Corporation, Cortland, N.Y.

[21] Appl. No.: 877,063

[22] Filed: Jun. 23, 1986

[51] Int. Cl.[4] .......................... B41J 5/30; G06F 11/00
[52] U.S. Cl. ........................................... 400/64; 400/7;
 400/697; 364/900
[58] Field of Search ................. 400/7, 64, 697, 697.1;
 364/200 MS File, 900 MS File

[56] References Cited

U.S. PATENT DOCUMENTS

| | | | |
|---|---|---|---|
| 2,217,150 | 10/1940 | Ayres | 400/7 |
| 3,631,957 | 1/1972 | Terry | 400/7 |
| 3,780,846 | 12/1973 | Kolpek | 400/697.1 |
| 3,895,704 | 7/1975 | Norris | 400/7 |
| 3,915,278 | 10/1975 | Spence et al. | 400/64 |
| 4,087,852 | 5/1978 | Campbell et al. | 400/64 |
| 4,480,931 | 11/1984 | Kamikura et al. | 400/64 |

FOREIGN PATENT DOCUMENTS 5774  1/1981  Japan .................................. 400/697

OTHER PUBLICATIONS

"Editor Inserted Soft Hyphenation"; Anonymous; *IBM Technical Disclosure Bulletin*; vol. 29, No. 1, pp. 383–384; Jun. 1986.

*Primary Examiner*—Charles A. Pearson
*Assistant Examiner*—David A. Wiecking
*Attorney, Agent, or Firm*—Kenneth W. Greb

[57] ABSTRACT

An electronic typewriter has a right margin zone hyphenation system operable with an error correction function to provide a reasonably aligned right margin of printed lines on a work sheet. To hyphen a word or a partial word printed in the hyphenation zone, the operator positions a print mechanism to a hyphen position within the word and depresses a hyphen key. The electronics automatically erases the characters at the hyphen position and to the right of the hyphen position, prints a hyphen at the hyphen position, moves the print mechanism to a left margin, indexes the work sheet and prints the characters erased from the preceding line at the left margin on the next line. The hyphenation system is also operable to automatically erase an entire word in the hyphenation zone and reprint the word on the next line.

11 Claims, 6 Drawing Figures

RIGHT MARGIN ZONE HYPHENATION

BACKGROUND OF THE INVENTION

1. Field of the Invention

This invention relates to electronic typewriters and, more particularly, it relates to hyphenating words at a right margin to provide reasonably aligned right margins of printed lines on a work sheet.

2. Prior Art

A common procedure used to hyphen words for reasonably aligning right margins is to print a complete word after hearing a conventional right margin signal, manually erase printed characters until reaching a hyphen position of a word, print a hyphen, depress a carrier return key, and manually retype the erased characters.

Disadvantages of this procedure are the requirement of a typist performing several manual operations and the burden on the typist to remember which characters were erased for printing on the next line.

A U.S. Pat. No. 3,780,846 issued Dec. 25, 1973 and invented by Robert A. Klopek and Robert A. Rahenkamp teaches reprinting erased characters from memory after a typist adds new characters in print positions of erased characters. The characters were erased for the purpose of making insertions in previously typed text.

A U.S. Pat. No. 2,717,686 issued on Sept. 13, 1955 and invented by Robert R. Seeber, Jr. teaches automatic printing from memory at the beginning of the next line when a hyphen is printed at the end of a previous line. The purpose of this invention is to automatically print selected words or phrases from memory to reduce the efforts of the typist and to increase the speed of the typist.

Neither of these two patents teach automatic erasing printed characters and printing a hyphen in response to depressing a hyphen key for the purpose of reasonably aligning right margins.

SUMMARY OF THE INVENTION

An electronic typewriter has a right margin zone hyphenation system which can be made active or inactive by an operator depressing a multiple key sequence. The hyphenation system is operable with an error correction function. The error correction function includes a correction buffer operable to store code information representing characters in each print position and includes an erase mechanism operable to erase printed characters.

When the zone hyphenation system is active and the operator depresses a carrier return key while the print mechanism is in the hyphenation zone, a double beep is sounded to inform the operator that the hyphenation system is active and that the print mechanism will not move. The operator has a choice to hyphenate a word, move the entire word to the next line or leave the word as printed and return the print mechanism to a left margin for printing on the next line.

If the operator chooses to hyphenate a word, the operator simply positions the print mechanism at a hyphen position within a word and depresses a hyphen key. The electronics and other functions in the typewriter automatically:

(1) operates the error correction function to erase the printed characters from the end of the word to and including the hyphen position;

(2) places code information representing the erased characters into a memory register;

(3) operates the print mechanism to print a hyphen;

(4) operates a carrier return function to index a work sheet and to locate the print mechanism at a left margin; and (5) operates the print mechanism to print the erased characters stores in the memory register.

If the operator chooses to move the entire word to the next line, the operator simply positions the print mechanism at a space position before the word and depresses the hyphen key. The electronics and other functions in the typewriter automatically:

(1) operates the error correction function to erase the whole word;

(2) places code information representing the erased characters into a memory register;

(3) avoids printing a hyphen;

(4) operates a carrier return function to index a work sheet and to locate the print mechanism at a left margin; and (5) operates the print mechanism to print the erased characters stored in the memory register.

If the operator chooses to leave the word as printed, the operator simply depresses the carrier return key a second time. The electronics operates a carrier return function to index a work sheet and to locate the print mechanism at a left margin.

Accordingly, an object of this invention is to provide an electronic typewriter with a feature for conveniently and efficiently hyphenating a word or erasing an entire word or leaving a word in a right margin zone to reasonably align a right margin of printed lines on a work sheet.

Another object of this invention is to provide the convenient and efficient hyphenation feature in an electronic typewriter without increasing the manufacturing cost of the typewriter.

Other objects, features and advantages of the invention will become more apparent from the following description, including appended claims and accompanying drawing.

DETAILED DESCRIPTION OF THE INVENTION

Figure 1:
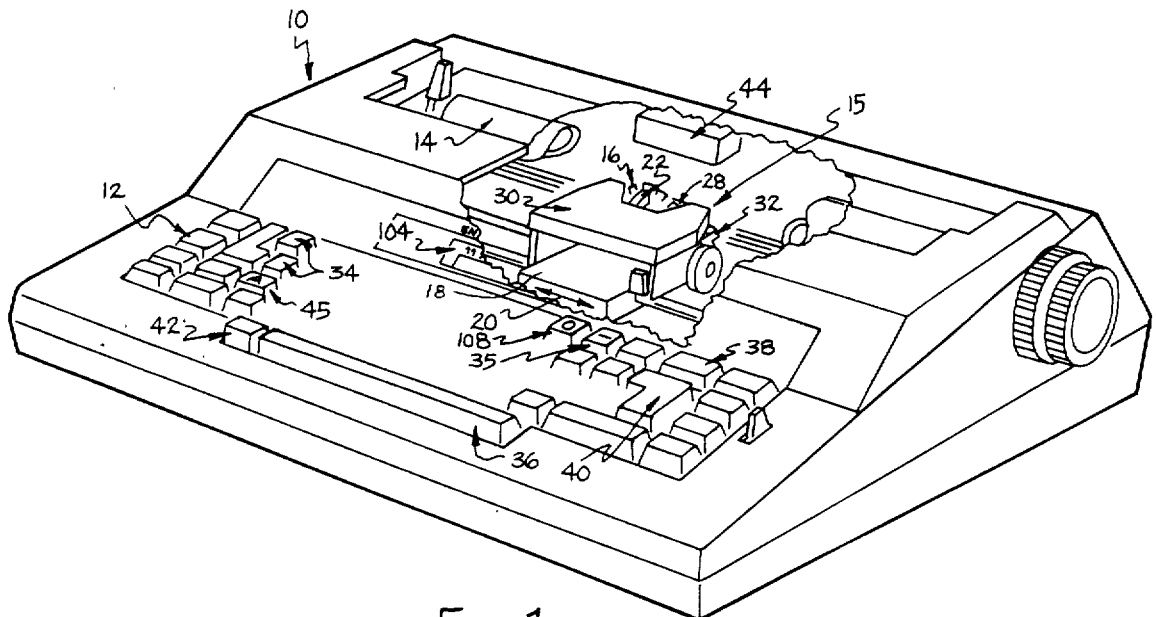
FIG. 1 is a perspective frontal view of an electronic typewriter sectioned to show components operated according to the teachings of the present invention.

An electronic correcting typewriter 10 according to the invention is shown in FIG. 1. Generally, an electronic typewriter 10 comprises a keyboard 12, a platen 14, and a print mechanism 15 which includes a print wheel 16 and a carrier 18 which supports the print wheel 16. The carrier 18 is mounted in the typewriter 10 for left and right horizontal movement along platen 14 as is indicated by arrow 20.

Print wheel 16, also known as a "daisy" wheel, has a plurality of radial petals or spokes 22, each supporting a respective character of the keyboard 12. A print hammer 24 (FIG. 2) is positioned adjacent to print wheel 16 for striking an aligned petal 22 against a sheet of paper 26 or other recording medium supported on platen 14.

A print ribbon mechanism includes an exposed portion of inked ribbon 28 extending from a cartridge 30 which is mounted on the carrier 18. Carrier 18 also supports a correction mechanism including a correction ribbon 32. Inked ribbon 28 may be an inked fabric or carbon film type of ribbon and correction ribbon 32 may be of a type having a coating of adhesive or white overlay material for making lift-off or cover-up corrections.

Keyboard 12 contains the usual plurality of character keys 34 including a hyphen key 35 and carrier control function keys including a spacebar 36, a backspace key 38, a carrier return key 40 and a Code Key 42. Upon actuation of any key on keyboard 12, a respective keyboard output signal is communicated to an electronic control circuit 44 (FIGS. 1 and 3) which has various outputs controlling functions and operations of typewriter 10, principally, operation of the print wheel 16 and other components assembled on carrier 18.

More specifically, when a character key 34 is depressed to print, e.g., key 45 representing the letter "a", a unique signal representative of that character is communicated to control circuit 44 which in turn generates appropriate commands for (1) rotating the print wheel 16 to bring the selected character petal 22 upright, (2) lifting the print ribbon 28 between the petal 22 and the sheet of paper 26, and (3) actuating the print hammer 24. The letter "a" will thus be imprinted over print ribbon 28 onto paper 26.

Further, when the spacebar 36 is depressed, a unique signal representing a forward "space" move to the right is communicated to control circuit 44 which in turn controls the carrier 18 to move forward one character position without printing. In a similar manner, carrier 18 is controlled to move backwards one character position in response to actuation of the backspace key 38. When the carrier return key 40 is actuated, the carrier 18 is caused to move leftwardly to the position of the left margin or stop setting and the paper 26 is indexed or fed upwardly for exposing a fresh print line.

Figure 2:
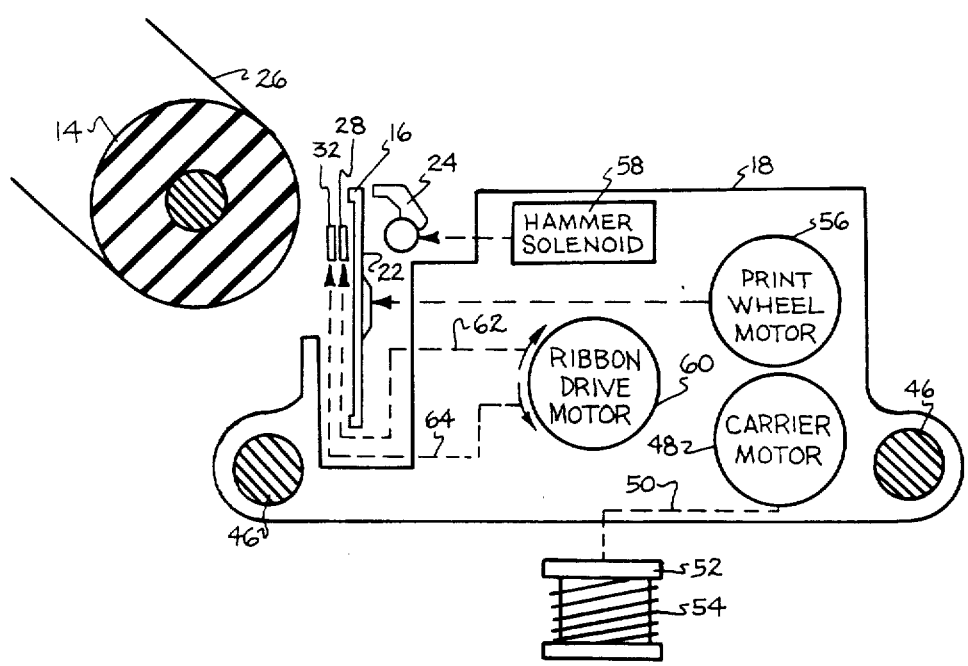
FIG. 2 is a schematic side view of a printing mechanism mounted on a carrier and a platen of the electronic typewriter of FIG. 1.

FIG. 2 shows a schematic diagram of the principal mechanisms assembled on carrier 18 and their relationship to platen 14. The showing of FIG. 2 is schematic only in order to facilitate an understanding.

As previously mentioned, carrier 18 is able to move horizontally to the left and right as indicated by arrow 20 of FIG. 1. Carrier 18 is supported to slide on guide rails 46 fixedly mounted to extend parallel to platen 14. A Carrier Motor 48 is coupled by a mechanical linkage, schematically represented by a broken line 50, to rotatively drive a cable pulley 52. A cable 54 is wound about pulley 52 in a manner permitting simultaneous winding and unwinding. The cable 54 is fixedly anchored to the typewriter 10 to prevent movement of the cable 54 in the direction of the carrier movement. Carrier Motor 48 is operated under control of control circuit 44 for causing carrier 18 to move to the left or to the right along the platen 14 by the pulley 52 winding and unwinding along the fixedly anchored cable 54.

Print wheel 16 is operated by a Print Wheel Motor 56 so that any radial petal 22 can be rotatively brought upright for printing. Print Wheel Motor 56 is also operated under control of control circuit 44. After the selected character petal 22 is located upright, hammer 24 is fired by a connected Hammer Solenoid 58 also under control of the control circuit 44. The upright petal 22 is deflected by the propelling hammer 24 to strike against the paper 26 on the platen 14 for either printing over print ribbon 28 or erasing over correction ribbon 32 when typewriter 10 is operated in correction mode.

The ribbons 28, 32 are operated by a Ribbon Drive Motor 60 under control of the control circuit 44. A mechanical linkage, schematically represented by broken line 62, couples the Ribbon Drive Motor 60 to operate print ribbon 28 and a mechanical linkage 64 is connected from the Ribbon Drive Motor 60 to enable operation of the correction ribbon 32. The Ribbon Drive Motor 60 operates one ribbon when driven in one direction and operates the other ribbon when driven in the other direction. For example, when the Ribbon Drive Motor 60 is powered clockwise, the print ribbon 28 is raised and, when the Ribbon Drive Motor 60 is operated in correction mode to rotate counterclockwise, the correction ribbon 32 is raised as is illustrated in FIG. 2.

Figure 3:
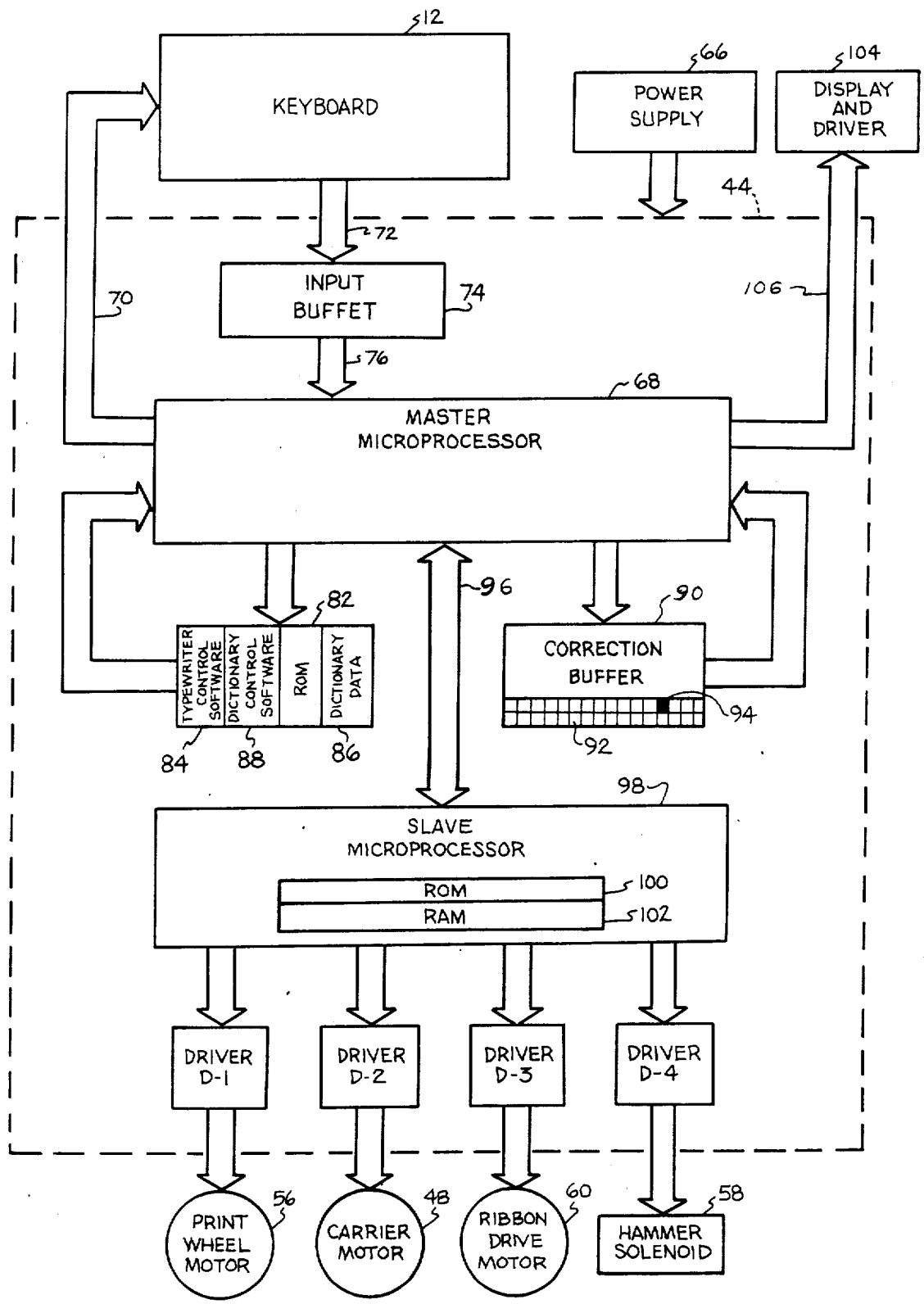
FIG. 3 is a block diagram of the electronics for controlling functional operations of the typewriter including the right margin zone hyphenation system.

The block diagram of FIG. 3 provides an overall view of the control circuitry 44 used for implementing the right margin zone hyphenation system of the present invention. A Power Supply 66 is connected to supply the electric power necessary to operate the various electronic components in control circuitry 44. As is shown in FIG. 3, keyboard 12 communicates with a known Master Microprocessor 68 as a result of an equally known interrupt technique issued periodically (e.g. every 7 milliseconds) on bus line 70. Master Microprocessor 68 is a known electronic component, such as, the 8031 made by Intel Corporation of Santa Clara, Calif. As a result of the interrupt, the keyboard 12, and more particularly, the matrix arrangement of keys is scanned to detect any key actuations. A logic code signal representative of a key actuation appear on bus line 72 extending to an Input Buffer 74. Keyboard signals are temporarily stored by the Input Buffer 74 in the order of keyboard input. Master Microprocessor 68 receives data from Input Buffer 74 via bus line 76. The input Buffer 74 is a Hex Non-Inverting buffer, such as a CD 4503 manufactured by National Semiconductor of Santa Clara, Calif.

Master Microprocessor 68 is associated with external electronics including a ROM unit 82 for controlling operation of Master Microprocessor 68. Included in ROM unit 82 is typewriter control software 84, dictionary data 86 comprising character codes forming a list of words and dictionary control software 88. A Correction Buffer 90 is operatively associated with Master Microprocessor 68 and includes a stack of memory cells or code memory registers 92 for storing code information of selected characters processed by Master Microprocessor 68. The Correction Buffer 90 is addressable by a display cursor or a find pointer 94 (shown solid), located at one register corresponding to the current location of carrier 18. In this regard the character of the current carrier 18 position can be recalled from Correction Buffer 90 for correction purposes. Find pointer 94 progressively moves through the stack of memory registers 92 in conjunction with movement of carrier 18 so that one register has character information of a related one character position along platen 14. A 4096 bit (1024×4 bits) static RAM identified as 2114 preferably comprises Correction Buffer 90.

A character code signal ready for typewriter processing is sent along line 96 (output channels) from Master Microprocessor 68 to a further microprocessor 98 which is slaved with respect to microprocessor 68 as master. Slave Microprocessor 98 (e.g. the 8051 also made by Intel and identical to the 8031 except for program memory) has an internal program stored in a ROM (4 K×8 Read Only Memory) 100 and the code data being stored in a RAM (128×8) 102. Code data is read from RAM 102 as necessary for the program in ROM 100 to develop, in known fashion, the control and drive signals for operational control of the various elements of carrier 18 namely, Printwheel Motor 56, Carrier Motor 48, Ribbon Drive Motor 60 and Hammer Solenoid 58.

The dictionary control software 88 compares character code signals for each character entered from the keyboard 12 with character code signals forming the list of words in the dictionary data 86 for detecting spelling errors. When a spelling error is detected, the control circuit 44 provides an audible warble to inform the operator that an error has occurred.

External Drivers D-1, D-2, D-3 and D-4 are connected to receive code data read from RAM 102 of Slave Microprocessor 98 for controlling operation of motors 56, 48, 60 and solenoid 58, respectively. Drivers D-1, D-2 and D-3 are conventional Quad Drivers (e.g. 2069) for decoding the data and for issuing appropriate control signals to connected motors 56, 48, and 60. The driver control signals regulate precise angular rotation and direction of motors 56, 48, and 60. Driver D-1 issues appropriate signals to Printwheel Motor 56 for rotatably positioning print wheel 16 according to the code generated by one of the character keys 34. Driver D-2 develops the signals necessary for stepping Carrier Motor 48 to incrementally move carrier 18 through character positions along platen 14. Driver D-3 controls the Ribbon Drive Motor 60, such that, print ribbon 28 is operated (via linkage 62) for printing when motor 60 is energized to rotate in one direction (clockwise in FIG. 2) and correction ribbon 32 is enabled (via linkage 64) for erasing when motor 60 is energized to rotate in the opposite (counterclockwise) direction. Typewriter 10 is operating in correction mode when Ribbon Drive Motor 60 is controlled to rotate in the counterclockwise direction enabling ribbon 32. Driver D-4 is in the form of a known kind of electronic latch for controlling operation of Hammer Solenoid 58 and is timed with respect to the other drivers 1-3 such that hammer 24 is actuated after printwheel character selection is made and one of the ribbons 28, 32 is elevated.

A character display unit 104 (FIG. 1) is built into the typewriter 10. This display unit 104 has a commonly used maximum capacity display of sixteen characters. The display unit 104 (FIG. 3) is connected to receive code data from the Master Microprocessor 68 via bus line 106 for entering characters on the display unit 104.

The operator has a choice to activate or inactivate the zone hyphenation system. To activate the zone hyphenation system, the operator depresses and holds the Code Key 42 while depressing the number "0" key 108. A beep is sounded and "Auto Zone On" appears on the Display 104 to inform the operator that the zone hyphenation system is active. The hyphenation zone is only active at four or more print positions past a right margin print position 110.

Even though the preferred embodiment of the hyphenation zone starts at the fourth print position past the right margin print position 110, the hyphenation zone could start at the right margin print position 110 or at other print positions near the end of a print line.

To inactivate the zone hyphenation system, the operator depresses and holds the Code Key 42 while depressing the number "0" key 108. No beep will be sounded but "Auto Zone Off" will appear on the display 104 to inform the operator that the zone hyphenation system is inactive.

The zone hyphenation system could be made active or inactive by actuating a switch or a dedicated key instead of the combination of the Code Key 42 and the "0" Key 108.

If the zone hyphenation system has been activated, if the printing mechanism has entered the hyphenation zone and if the operator wants to print a hyphen further back in the print line before the right margin print position 110, then the operator will need to deactivate the zone hyphenation system. This deactivation is necessary to avoid erasing all of the printed characters to the right of the print position where the hyphen was to be printed and to avoid the automatic printing of the erased characters on the next line.

Figure 4:
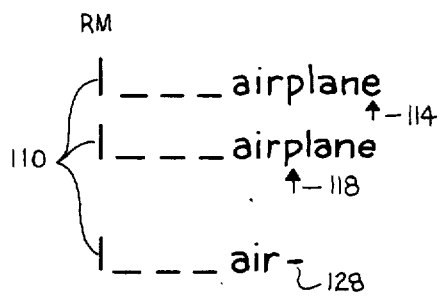
FIG. 4 is an example showing the use of the present invention at the right margin for hyphenating a word.

When the zone hyphenation system is active and the operator has typed a word "airplane" as an example, in the right margin hyphenation zone (FIG. 4) and has depressed the carrier return key 40, a double beep is sounded. The double beep informs the operator that the zone hyphenation system is active and that the print mechanism 15 will not move to the left margin. The operator now has a choice to hyphenate a word, move the entire word to the next line or leave the word as printed and return the print mechanism 15 to the left margin for printing on the next line.

Figure 5:
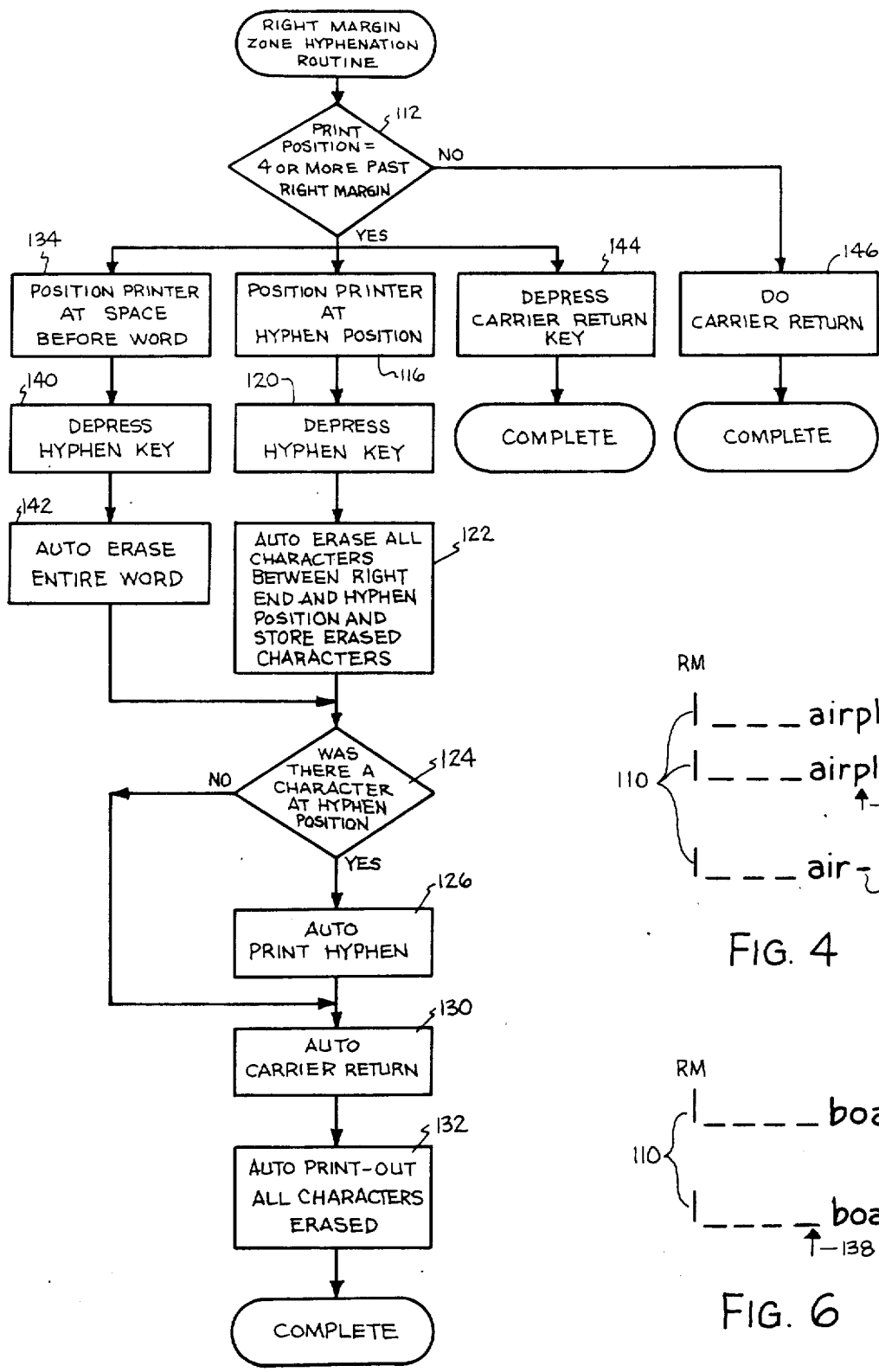
FIG. 5 is a flow chart of the right margin zone hyphenation routine according to the present invention.

In the flov chart of FIG. 5, the following conventional box shapes are used: boxes with semi-circular ends represent the start or a stop of a subroutine, a rectangular box represents a processing function or an operation, and a diamond box represents a decision for selecting one of two alternative outputs. As with most microprocessors, the control circuit 44 of FIGS. 1 and 3 has a regular program idling loop in which it makes rounds or sequential interrogations of the various registers and initiates certain routines or operations according to the status of these registers. For clarity and ease of description, only the portions of routines relevant to the present right margin zone hyphenation system are depicted in the flow chart.

In accordance with the present invention, in the flow chart of FIG. 5 there is a subroutine entitled "Right Margin Zone Hyphenation Routine". The first Box 112 in this routine relates to a first decision in response to the depression of the carrier return key 40. The first decision is to determine if the print hammer 24 is located four or more print positions past the right margin print position 110 (the hyphenation zone). If the decision is YES, then two beeps will be sounded to inform the operator that the print hammer 24 is in the hyphenation zone and then the print hammer 24 remains stationary even though the carrier return key 40 has been depressed. Using the example shown if FIG. 4, if the operator chooses to hyphenate the word "airplane" and if the print hammer 24 is typically located at a print position 114 in alignment with the last printed character "e", the decision of the Box 112 is YES. The flow then goes to an operational Box 116. In Box 116, the operator positions the print hammer 24 in a print position 118 in alignment with the printed character "p". The flow now goes to an operational Box 120 where the operator depresses the hyphen key 35. In the next operational Box 122, the characters "plane" are all erased automatically by the typewriter 10 operating in the error correction mode. In response to depression of the hyphen key 35, the print hammer 24 moves from the print position 118 to the print position 114. The characters "plane" are then erased starting with the character "e" and continuing erasing characters in a backspace direction until the character "p" is erased. The print position of the character "p" was the same print position in alignment with the print hammer 24 when the depression of the hyphen key 35 occurred. The erased characters "plane" are then stored in a memory register in the slave microprocessor 98.

In another embodiment, the characters could be erased starting with the character "P" and continuously erase characters in the forward direction until all the printed characters are erased.

A decision is then made by a Box 124 to determine if a character was originally printed at the print position 118 where the hyphen key 35 was depressed. In this example, the determination is YES since the letter "p" was in the print position 118. The flow then goes to operational Box 126 which causes a hyphen 128 (FIG. 4) to print at the print position 118. If the determination by Box 124 was NO, then the flow would bypass Box 126 and go to operational Box 130. Continuing with the example shown in FIG. 4, after the hyphen 128 is printed by Box 126, the flow goes to the Box 130. The Box 130 causes a carrier return operation to locate the print hammer 24 at a left margin and causes the work sheet 26 to index for printing on the next line. The flow then goes to operational Box 132. In the Box 132, all of the characters erased from the preceding line in the hyphenation zone, in this example "plane", are automatically printed at the left margin on the next line. This ends this portion of the right margin zone hyphenation routine based on the operator's choice to hyphenate the word "airplane".

To summarize this portion of the routine, after the operator positions the print hammer 24 in the print position 118 (Box 116) and depresses the hyphen Key 35 (Box 120), a series of operations are automatically performed by the typewriter 10 as follows:

(1) printed characters ("plane") in the hyphenation zone started from the right-most character ("e") and stopping at the print position where the hyphen key 35 was depressed ("p") are erased;

(2) a hyphen 128 is printed at the print position 118 where the hyphen key 35 was depressed;

(3) the carrier 18 moves the print hammer 24 to the left margin and the work sheet 26 is indexed for printing on the next line; and (4) all the characters ("plane") erased from the preceding line in the hyphenation zone are printed.

Figure 6:
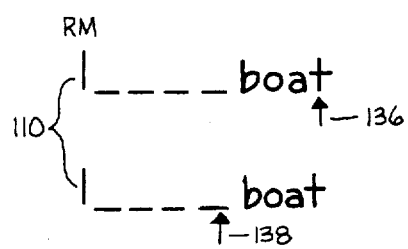
FIG. 6 is an example showing the use of the present invention at the right margin for moving an entire word to the next line.

When the decision of the Box 112 is YES and if the operator chooses to move an entire word "boat" (FIG. 6) to the next line, then the flow goes to Box 134. In Box 134, the operator positions the print hammer 24 from a typically located print position 136 to a position 138 before the word which would be a space rather than a printed character. The space before the word needs to be in the hyphenation zone (four spaces or more past the right margin print position 110). The flow goes to Box 140 where the operator depresses the hyphen key 35. In the next operational Box 142, the entire word is erased automatically by the typewriter 10 operating in the error correction mode. The flow now goes to Box 124. Since the print hammer 24 is located at print position 138 where there was no printed character, the decision of Box 124 is NO. Therefore, the flow goes to Box 130 which avoids printing a hyphen and which causes a carrier return operation to locate the print hammer 24 at the left margin and causes the work sheet 26 to index for printing on the next line. Again, the flow goes to Box 132 which automatically prints all of the characters erased from the preceding line in the hyphenation zone at the left margin on the next line. In the example of FIG. 6, the word "boat" is printed. This ends the routine based on the operators choice to move the entire word to the next line.

When the decision of the Box 112 is YES and if the operator chooses to leave the word as printed, then the flow goes to an operational Box 144. In the Box 144, the operator depresses the carrier return key 40 a second time which locates the print hammer 24 at the left margin and causes the work sheet 26 to index for printing on the next line. This ends the routine based on the operator's choice to leave the word as printed.

When the decision of the Box 112 is NO in response to an operator depressing the carrier return key 40, the flow goes to an operational Box 146. In Box 146, the print hammer 24 is moved to a left margin and the work sheet 26 is indexed for printing on the next line. This ends the routine based on a NO decision made by the Box 112.

In summary, it can now be understood that the present invention provides an electronic typewriter with a convenient and efficient hyphenating feature for reasonably aligning right margins of printed line on a work sheet. The automatic erasing of printed characters in the hyphenation zone, returning the carrier and print hammer to a left margin and printing the erased characters eliminates the burden of the operator to perform each one of these functions manually.

What is claimed is:

1. A right margin zone hyphenation system for use in an electronic typewriter having a keyboard with a plurality of character keys including a hyphen key and function keys including a carriage return key selectable for issuing unique signals, a platen, a carrier, a printing mechanism including a print hammer supported on the carrier for printing characters at selected print positions on printing lines on a work sheet supported on the platen, the selected print positions includes a left margin and a right margin having several print positions, a correction mechanism for erasing previously printed characters from the word sheet, bi-directional feeding means for horizontally moving the carrier relative to the platen, electronic processor means for receiving the unique signals from selected keyboard keys and for controlling functional operation of typewriter mechanisms in accordance with the signals received, a correction buffer connected to the processor means, the correction buffer including a plurality of memory registers capable of storing therein character codes and corresponding print positions representative of the last plurality of printed characters, the right margin zone hyphenation system comprising:

means responsive to depression of the carriage return key for determining if the printing mechanism is located in a predetermined hyphenation zone within the right margin;

means responsive to depression of the hyphen key for automatically erasing from the work sheet printed characters in the hyphenation zone when the printing mechanism is determined to be in the hyphenation zone; and means further responsive to depression of the hyphen key for automatically printing a hyphen at a predetermined print position in the hyphenation zone.

2. The right margin zone hyphenation system of claim 1 further comprising means for automatically moving the carrier to the left margin upon completion of printing the hyphen.

3. The right margin zone hyphenation system of claim 2 further comprising means for automatically printing the characters erased from the hyphenation zone on a preceding line at the left margin on the next line.

4. The right margin zone hyphenation system of claim 1 wherein said means for automatically erasing the printed characters includes means for erasing the printed characters starting with the last printed character and continuing erasing printed characters in a backspace direction until erasing the printed character at a print position being the same as a print position in alignment with the print hammer when the single depression of the hyphen key occurred.

5. A right margin zone hyphenation system for use in an electronic typewriter having a keyboard with a plurality of character keys including a hyphen key and function keys including a carriage return key selectable for issuing unique signals, a platen, a carrier, a printing mechanism including a print hammer supported on the carrier for printing characters at selected print positions on printing lines on a work sheet supported on the platen, the selected print positions includes a left margin and a right margin having several print positions, a correction mechanism for erasing previously printed characters from the work sheet, bi-directional feeding means for horizontally moving the carrier relative to the platen, electronic processor means for receiving the unique signals from selected keyboard keys and for controlling functional operation of typewriter mechanisms in accordance with the signals received, a correction buffer connected to the processor means, the correction buffer including a plurality of memory registers capable of storing therein character codes and corresponding print positions representative of the last plurality of printed characters, the right margin zone hyphenation system comprising:

means responsive to depression of the carriage return key for determining if the printing mechanism is located in a predetermined hyphenation zone within the right margin;

means responsive to depression of the hyphen key for automatically erasing from the work sheet printed characters in the hyphenation zone when the printing mechanism is determined to be in the hyphenation zone; and means further responsive to depression of the hyphen key for automatically moving the carrier to the left margin upon completion of erasing printed characters.

6. The right margin zone hyphenation system of claim 5 further comprising means for automatically printing the characters erased from the hyphenation zone on a preceding line at the left margin on the next line.

7. A method for reasonably aligning right margins of printed lines on a work sheet in an electronic typewriter having a hyphenation zone, a keyboard with a plurality of character keys including a hyphen key and function keys including a carriage return key selectable for issuing unique signals, a platen, a carrier, a printing mechanism including a print hammer supported on the carrier for printing characters at selected print positions on printing lines on a work sheet supported on the platen, the selected print positions includes a left margin and a right margin having several print positions, a correction mechanism for erasing previously printed characters from the work sheet, bi-directional feeding means for horizontally moving the carrier relative to the platen, electronic processor means for receiving the unique signals from selected keyboard keys and for controlling functional operation of typewriter mechanisms in accordance with the signals received, a correction buffer connected to the processor means, the correction buffer including a plurality of memory registers capable of storing therein character codes and corresponding print positions representative of the last plurality of printed characters, the method comprising the steps of:

determining in response to depression of the carrier return key, if the printing mechanism is located in a predetermined hyphenation zone within the right margin automatically, in response to depression of the hyphen key, erasing from the work sheet printed characters in the hyphenation zone when the printing mechanism is determined to be in the hyphenation zone; and automatically, further in response to depression of the hyphen key, printing a hyphen at a predetermined print position in the hyphenation zone.

8. The method for reasonably aligning right margins of printed lines on a work sheet of claim 7 further comprising the step of automatically moving the carrier to the left margin upon completion of printing the hyphen.

9. The method for reasonably aligning right margins of printed lines on a work sheet of claim 8 further comprising the step of automatically printing the characters erased from the hyphenation zone on a preceding line at the left margin on the next line.

10. A method for reasonably aligning right margins of printed lines on a work sheet in an electronic typewriter having a hyphenation zone, a keyboard with a plurality of character keys including a hyphen key and function keys including a carriage return key selectable for issuing unique signals, a platen, a carrier, a printing mechanism including a print hammer supported on the carrier for printing characters at selected print positions on printing line on a work sheet supported on the platen, the selected print positions includes a left margin and a right margin having several print positions, a correction mechanism for erasing previously printed characters from the work sheet, bi-directional feeding means for horizontally moving the carrier relative to the platen, electronic processor means for receiving the unique signals from selected keyboard keys and for controlling functional operation of typewriter mechanisms in accordance with the signals received, a correction buffer connected to the processor means, the correction buffer including a plurality of memory registers capable of storing therein character codes and corresponding print positions representative of the last plurality of printed characters, the method comprising the steps of:

determining, in response to depression of the carrier return key, if the printing mechanism is located in a predetermined hyphenation zone within the right margin;

automatically, in response to depression of the hyphen key, erasing from the work sheet printed characters in the hyphenation zone when the printing mechanism is determined to be in the hyphenation zone; and automatically, further in response to depression of the hyphen key, moving the carrier to the left margin upon completion of erasing printed characters.

11. The method for reasonably aligning right margins of printed lines on a work sheet of claim 10 further comprising the step of automatically printing the characters erased from the hyphenation zone on a preceding line at the left margin on the next line.

* * * * *